United States Patent [19]

Karayannis et al.

[11] 4,189,556

[45] Feb. 19, 1980

[54] POLYMERIZATION PROCESS

[75] Inventors: Nicholas M. Karayannis, Naperville; Sam S. Lee, Hoffman Estates, both of Ill.

[73] Assignee: Standard Oil Company (Indiana), Chicago, Ill.

[21] Appl. No.: 696,813

[22] Filed: Jun. 16, 1976

[51] Int. Cl.$^2$ .................... C08F 4/66; C08F 10/06
[52] U.S. Cl. .................... 526/141; 252/429 B; 526/128; 526/136; 526/138; 526/139; 526/351
[58] Field of Search ........................... 526/141

[56] References Cited

U.S. PATENT DOCUMENTS

| | | | |
|---|---|---|---|
| 3,219,648 | 11/1965 | Hill | 526/141 |
| 3,281,401 | 10/1966 | Harban et al. | 526/141 |
| 3,502,634 | 3/1970 | Stedefeder et al. | 526/141 |
| 3,534,006 | 10/1970 | Komaishi et al. | 526/141 |
| 3,984,350 | 10/1976 | Karayannis et al. | 526/142 |

FOREIGN PATENT DOCUMENTS

| | | | |
|---|---|---|---|
| 44-20098 | 8/1969 | Japan | 526/141 |
| 1020873 | 2/1966 | United Kingdom | 526/141 |

*Primary Examiner*—Edward J. Smith
*Attorney, Agent, or Firm*—Wallace L. Oliver; Arthur G. Gilkes; William T. McClain

[57] ABSTRACT

In an alpha-olefin polymerization process using a transition metal halide-aluminum alkyl catalyst system, addition of minor, effective amounts of aromatic amines or amine N-oxides substituted with electron withdrawing groups decreases the amount of low molecular weight or amorphous polymer produced.

9 Claims, No Drawings

POLYMERIZATION PROCESS

BACKGROUND OF THE INVENTION

This invention relates to alpha-olefin polymerization processes and particularly relates to catalyst systems in such processes which produce commercially acceptable levels of low molecular weight and, especially, amorphous polymers as determined by the amount of polymerized product which is soluble in n-hexane.

The polymerization of alpha-olefins to normally-solid, substantially crystalline polymers using heterogeneous catalysts comprising transition metal halides and aluminum alkyls now is well-known in the art. However, there is a continuing need in the industry for catalyst systems which have a high yield, as measured by the grams of crystalline product per gram of transition metal halide consumed, while producing a minimum amount of n-hexane-soluble polymer. In a slurry polymerization process which uses a hydrocarbon solvent, such as n-hexane, amorphous and low molecular weight polymer accumulates in the solvent which necessitates extensive solvent purification procedures. Sice the economic value of such hexane-soluble polymer is lower than normally-solid, substantially crystalline product, the overall process becomes less efficient as the amount of n-hexane soluble product increases.

In a solventless, liquid-phase bulk polymerization or in a vapor phase process, the production of polymers which contain more than about 2% of n-hexane-soluble product requires a separate extraction procedure to produce commercially acceptable products and makes these inherently efficient processes uneconomical. Therefore, polymerization processes which produce low amounts of n-hexane-soluble polymer while not adversely affecting polymerization yield are in demand.

Various catalyst components in addition to transition metal halides and aluminum alkyls have been disclosed to minimize hexane-soluble products in alpha-olefin polymerization. Such additional components include aliphatic amines, tetraorganosilyl compounds such as tetraalkyl-, tetraaryl- and tetraalkoxysilanes, sterically hindered cyclic amines, amine N-oxides and organotin sulfides. One such system is described in U.S. Pat. No. 3,950,268 incorporated herein by reference.

It is an object of this invention to discover catalyst additives which decrease n-hexane-soluble products while maintaining reasonable polymerization activity.

SUMMARY OF THE INVENTION

In a process to polymerize alpha-olefins to normally-solid, substantially crystalline polymer utilizing a catalyst comprising a transition metal halide and an aluminum alkyl, this invention comprises adding to such catalyst effective amounts of an aromatic amine or amine-N-oxide substituted with a compatible electron-withdrawing group, whereby the amount of n-hexane-soluble polymeric product is decreased.

BRIEF DESCRIPTION OF THE INVENTION

In an alpha-olefin polymerization process using a transition metal halide-aluminum alkyl catalyst system, the addition to such catalyst system of minor amounts of aromatic amines and amine N-oxides substituted with electron withdrawing groups decreases the amount of n-hexane-soluble products formed while maintaining, and even increasing, the polymerization activity.

Suitable substituted aromatic amines and amine-N-oxides useful in this invention include substituted pyridines and pyridine-N-oxides such as p-nitropyridine-N-oxide, p-chloropyridine-N-oxide, p-carboxypyridine-N-oxide, p-nitrolutidine-N-oxide, p-nitropyridine, p-chloropyridine, m-acetylpyridine, p-acetylpyridine and the like. Substituted polycyclic nitrogen heterocycles also are useful, such as 5-nitroquinoline and 6-nitroquinoline.

Characteristically, the substituent groups useful in this invention are those recognized as being electron withdrawing and compatible with the polymerization system. Electron withdrawing groups are identified as having a positive Hammett substituent constant, sigma, as described in Chapter 4 of Hine, "Physical Organic Chemistry", 2d Ed., McGraw-Hill (1962), incorporated by reference herein. Suitable electron withdrawing substituent groups include nitro, chloro, bromo, carboxy, alkoxy, carboalkoxy, acetyl and the like.

Typical substituted aromatic N-oxides of this invention include compounds with the structure:

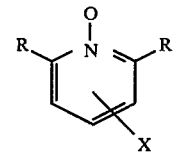

where R is hydrogen or an alkyl radical containing from 1 to about 4 carbon atoms and X is selected from the group consisting of —Cl, —Br, —NO₂ and —COOH. Preferably, R is hydrogen or methyl and X is —Cl, —NO₂ or —COOH. An especially useful additive of this invention is p-nitropyridine-N-oxide.

The exact amount of substituted aromatic amine-N-oxide useful in this invention varies depending upon the precise make-up of the other catalyst components and upon the polymerization conditions. Typically effective amounts range from about one-tenth mol percent to about 30 mol percent and preferably about 5 to 20 mol percent of the transition metal halide. Experimentally, as the amount of additive increases, the polymerization activity tends to increase to a maximum and then to decline.

The substituted aromatic N-oxides of this invention can be utilized in conjunction with effective catalyst coadditives such as hydrogen sulfide, sulfur dioxide, alkyl silicates, orthosilicate esters, Lewis bases such as phosphines, phosphites, phosphates, ethers, tertiary aliphatic amines, and ethers or an organometallic chalcogenide such as a bis(trialkyltin) sulfide. These additional additives can be present in minor amounts ranging from about one-tenth to 30 mol percent and preferably about 5 to 20 mol percent of the transition metal halide in the catalyst system.

The catalyst system described in this invention contains (a) an alkylaluminum compound and (b) a transition metal halide in addition to minor amounts of other additives.

Useful aluminum alkyls include trialkylaluminum, dialkylaluminum halides and mixtures thereof. Also catalytic effective amounts of such trialkylaluminums, dialkylaluminum halides and their mixtures can be used in conjunction with aluminum alkyl dihalides. An alkylaluminum halide-aluminum alkyl dihalide mixture commonly is called alkyl aluminum sesquihalide. Useful halides include bromides and chlorides and useful alkyl radicals contain from two to about six carbon atoms. The preferable halide is chloride and the preferable alkyl radical is ethyl. Diethylaluminum chloride (DEAC) or a mixture of DEAC and triethylaluminum (TEA) is most preferable. In a trialkylaluminum-dialkylaluminum halide mixture, the preferred amount of trialkylaluminum is about 20 to 50 mol percent. In a trialkylaluminum-alkylaluminum dihalide mixture, the preferred amount is about 30 to 70 mol percent and most preferably about 40 to 60 mol percent.

The transition metal halides useful as a component in the catalyst system of this invention are halides of transition metals of Groups IVB, VB and VIB of the Periodic Table. Preferably, the transition metal halide is a chloride of titanium, vanadium, chromium, molybdenum or zirconium. Most preferably, titanium trichloride and especially activated titanium trichloride is used. Titanium trichloride can be activated to a high degree of polymerization activity by chemical or physical means, such as by incorporating aluminum chloride in the titanium trichloride catalyst matrix or by comminuting the titanium trichloride catalyst component. One useful activated titanium trichloride has an approximate stoichimetric formula of $TiCl_3 \cdot \frac{1}{3}AlCl_3$ and has been mechanically activated. Further, titanium trichloride can be activated by forming adducts with Lewis bases such as ethers or by supporting the titanium trichloride on a catalytically inert substance such as a metal oxide or salt.

The molar ratio of transition metal halide to aluminum alkyl in a catalyst system can range from about one-tenth to about 10 and typically is about 1 to 3. The amount of catalyst in a polymerization depends on the reactor size and type and on the amount and type of olefin monomer and is known to the skilled artisan.

Since the catalyst systems used in this invention are sensitive to oxygen and moisture, suitable precautions should be taken during catalyst preparation, transfer and use.

The polymerization process of this invention can be utilized at pressures ranging from atmospheric to about 20,000 p.s.i.g. and preferably from about 30 to 1000 p.s.i.g.

The polymerization time depends on the process utilized. In batch processes the polymerization contact time usually is about one-half to several hours and typically is one to four hours in autoclave processes. In a continuous process, contact time in the polymerization zone is controlled as required and typically ranges from about one-half to several hours. Since in this type of process unreacted monomer continuously can be recycled into the polymerization zone, the contact time can be shorter than in a batch process.

The liquid organic solvents used in the slurry polymerization technique include aliphatic alkanes and cycloalkanes such as pentane, hexane, heptane or cyclohexane; a hydrogenated aromatic compound such as tetrahydronaphthalene or decahydronaphthalene; a high molecular weight liquid paraffin or mixtures of paraffins which are liquid at the reaction temperature; an aromatic hydrocarbon such as benzene, toluene or xylene; or a haloaromatic compound such as chlorobenzene, chloronaphthalene or o-dichlorobenzene. Other suitable solvents include ethylbenzene, isopropylbenzene, ethyltoluene, n-propylbenzene, diethylbenzenes, mono- and dialkylnaphthalenes, n-pentane, n-octane, isooctane and methyl cyclohexane. Preferably, liquid hydrocarbons are used; most preferably, hexane is the polymerization medium. Although the nature of the solvent can be varied considerably, the solvent should be liquid under the reaction conditions and should be relatively inert. Advantageously, the solvent used can be purified prior to use by distillation or by reaction with an aluminum alkyl to remove impurities.

The polymerization temperature depends upon the specific catalyst system used and can range from below about 0° C. to above about 120° C. However, at temperatures below about 0° C. the polymerization rate slows and reactor residence times become unreasonably long, while at temperatures above about 120° C. the polymerization rate is too high which results in excessive amounts of hexane-soluble products. Preferably, the temperature ranges from about 2° C. to about 95° C. and most preferably from about 50° C. to about 80° C.

This invention is most useful in polymerizing propylene to a normally solid, substantially crystalline polymer, although propylene also can be polymerized with ethylene or other alpha-olefins to form random, pure-block, terminal block and multisegment copolymers. Additionally, other alpha-olefins such as ethylene or styrene can be polymerized by this invention. Generally, polymers and copolymers of alpha-olefins with a structure of $CH_2=CHR$ where R is either hydrogen or an aliphatic, cycloaliphatic or aromatic radical containing up to about eight carbon atoms can be produced using this invention.

The normally solid poly(alpha-olefins) prepared according to this invention have molecular weights ranging from about 50,000 to 5,000,000 and typically range from about 200,000 to 2,000,000. The molecular weights of such poly(alpha-olefins) can be controlled by methods known to the art, such as by polymerizing in the presence of dialkyl zinc compounds or, preferably, in the presence of hydrogen in amounts determined by the molecular weight distribution desired.

This invention is demonstrated but not limited by the following Examples.

Examples I-III

In a dry nitrogen atmosphere, 0.6 millimoles of aluminum activated titanium trichloride (AA $TiCl_3$), 0.8 millimoles of TEA, 1.0 millimoles of DEAC (25 wt.% in hexane) and 0.5 millimoles of additive were placed in a pressure vessel equipped with a gas inlet tube, which contained 190 milliliters of n-hexane. After the vessel was capped, polymerization was initiated by feeding propylene into the vessel through the inlet tube. A pressure of 40 p.s.i.g. and a temperature of 70° C. was maintained for one hour. After the resulting product was deactivated by adding a mixture of 50 milliliters of n-hexane and 10 milliliters of methanol and stirring for one hour, the product was filtered and washed with about 100 milliliters of n-hexane and enough methanol to remove any catalyst residues. The insoluble, filtered product was dried for one hour at 90° C. and weighed. This weight divided by the weight of AA $TiCl_3$ used in the reaction is the Crystalline Yield. The combined filtrates were evaporated to dryness and the resulting Hexane Soluble product weighed.

A series of polymerizations were made, including some comparative runs, using various aromatic amine N-oxide additives. The data summarized in Table I show that while aromatic amine N-oxides generally reduce hexane solubles, those with electron withdrawing substitutents show increased activity. This is surprizing, since generally an additive which reduces hexane solubles is a catalyst poison, however electron-withdrawing substituted aromatic amine N-oxides appear to increase activity. The mechanism of this unexpected effect remains unexplained.

TABLE I

| Example (Run) | Additive | Crystalline Yield (g/g TiCl$_3$) | Hexane Solubles (%) |
|---|---|---|---|
| (A) | None | 158.1 | 31.5 |
| (B) | 4-methoxypyridine-N-oxide | 136.7 | 21.6 |
| (C) | 4-methylpyridine-N-oxide | 108.0 | 19.3 |
| (D) | pyridine-N-oxide | 114.0 | 22.6 |
| I | p-chloropyridine-N-oxide | 167.6 | 21.2 |
| II | p-carboxypyridine-N-oxide | 167.5 | 22.9 |
| III | p-bitropyridin-N-oxide | 230.8 | 21.2 |

Examples IV-V

In a manner similar to that described in Examples I-III, propylene polymerizations were run for four hours using a catalyst system consisting of 0.125 g of AA TiCl$_3$, 3.2 milliliters of DEAC and varying amounts of p-nitropyridine-N-oxide. The data are shown in Table II. It was found that addition of more than 0.01 g of additive to the system yielded lower polymerization activity.

TABLE II

| Example (Run) | p-Nitropyridine-N-Oxide (g) | Crystalline Yield (g/g TiCl$_3$) | Hexane Solubles (%) |
|---|---|---|---|
| (E) | None | 250.4 | 6.9 |
| IV | 0.005 | 259.6 | 6.2 |
| V | 0.01 | 261.6 | 6.1 |

EXAMPLES VI-VII

Propylene polymerizations were run in a manner similar to that described in Examples I-III using as a catalyst system consisting of 0.125 g of AA TiCl$_3$, 3.2 milliliters of DEAC, 0.03 g of p-nitropyridine-N-oxide and either bis(trimethyltin) sulfide (BTS) or 2,6-lutidine-N-oxide (LNO). The results are shown in Table III.

TABLE III

| Example | Coadditive (milliliters) | Crystalline Yield (g/g TiCl$_3$) | Hexane Solubles (%) |
|---|---|---|---|
| VII | 0.09 (1) | 239.2 | 2.4 |
| VIII | 0.02 (2) | 260.0 | 3.6 |

(1) 0.06 ml BTS + 0.03 ml LNO
(2) LNO

EXAMPLES VIII-XIV

Using a procedure similar to that described in Examples I-III, a series of four-hour propylene polymerizations were performed incorporating within the catalyst system acetylpyridines and nitroquinolines. The results are shown in Table IV.

The data in the Examples show that aromatic amine N-oxides substituted with electron withdrawing groups are polymerization catalyst additives which effectively reduce hexane-soluble polymerization products while maintaining overall activity.

TABLE IV

| Example (Run) | DEAC (25 wt. % in hexane) (ml) | TEA (ml) | Additive | Crystalline Yield (g/g TiCl$_3$) | Hexane Solubles (%) |
|---|---|---|---|---|---|
| (F) | 0.6 | 0.08 | None | 58.8 | 9.05 |
| VIII | 0.6 | 0.08 | 2-acetylpyridine (0.06 ml) | 101.2 | 3.42 |
| (G) | 0.6 | 0.08 | 3-acetylpyridine (0.06 ml) | 166.4 | 12.52 |
| IX | 0.6 | 0.08 | 3-acetylpyridine (0.03 ml) | 155.6 | 2.59 |
| (H) | 0.6 | 0.08 | 4-acetylpyridine (0.06 ml) | 148.8 | 14.19 |
| (J) | 1.1 | 0.20 | None | 185.6 | 6.53 |
| X | 1.1 | 0.20 | 3-acetylpyridine (0.06 ml) | 217.6 | 4.55 |
| (K) | 3.2 | — | None | 188.9 | 9.60 |
| XI | 3.2 | — | 5-nitroquinoline (0.2 g) | 206.0 | 3.20 |
| XII | 3.2 | — | 6-nitroquinoline (0.2 g) | 223.6 | 3.64 |
| (L) | 2.2 | — | None | 202.0 | 6.89 |
| XIII | 2.2 | — | 6-nitroquinoline (0.05 g) | 217.3 | 4.55 |
| XIV | 2.2 | — | 6-nitroquinoline (0.05 g) | 250.6 | 4.80 |

We claim:

1. In a process to polymerize alpha-olefins to normally-solid, substantially crystalline polymer utilizing a catalyst comprising transition metal halide and aluminum alkyl, the improvement comprising adding to such catalyst effective amounts of a pyridine, quinoline or pyridine-N-oxide substituted with a compatible electron-withdrawing group selected from the group consisting of nitro, chloro, bromo and carboxy whereby the amount of n-hexane soluble polymeric product is decreased.

2. The improvement of claim 1 wherein the alpha-olefin is propylene or a mixture of propylene and ethylene.

3. The improvement of claim 2 wherein the transition metal halide is a titanium trichloride.

4. The improvement of claim 3 wherein the aluminum alkyl is diethylaluminum chloride, triethylaluminum or a mixture thereof.

5. The improvement of claim 4 wherein the substituted pyridine-N-oxide is p-nitropyridine-N-oxide.

6. The improvement of claim 4 wherein the substituted quinoline is 5-nitroquinoline or 6-nitroquinoline.

7. The improvement of claim 4 wherein the substituted pyridine or pyridine-N-oxide is p-nitropyridine-N-oxide, p-chloropyridine-N-oxide, p-carboxypyridine-N-oxide, p-nitrolutidine-N-oxide, p-nitropyridine or p-chloropyridine.

8. The improvement of claim 1 wherein a substituted pyridine is added to the catalyst.

9. The improvement of claim 1 wherein a substituted pyridine-N-oxide is added to the catalyst.

* * * * *